L. W. THEIS.
GAS SHUT-OFF.
APPLICATION FILED NOV. 11, 1912.
1,125,210.
Patented Jan. 19, 1915.
3 SHEETS—SHEET 1.
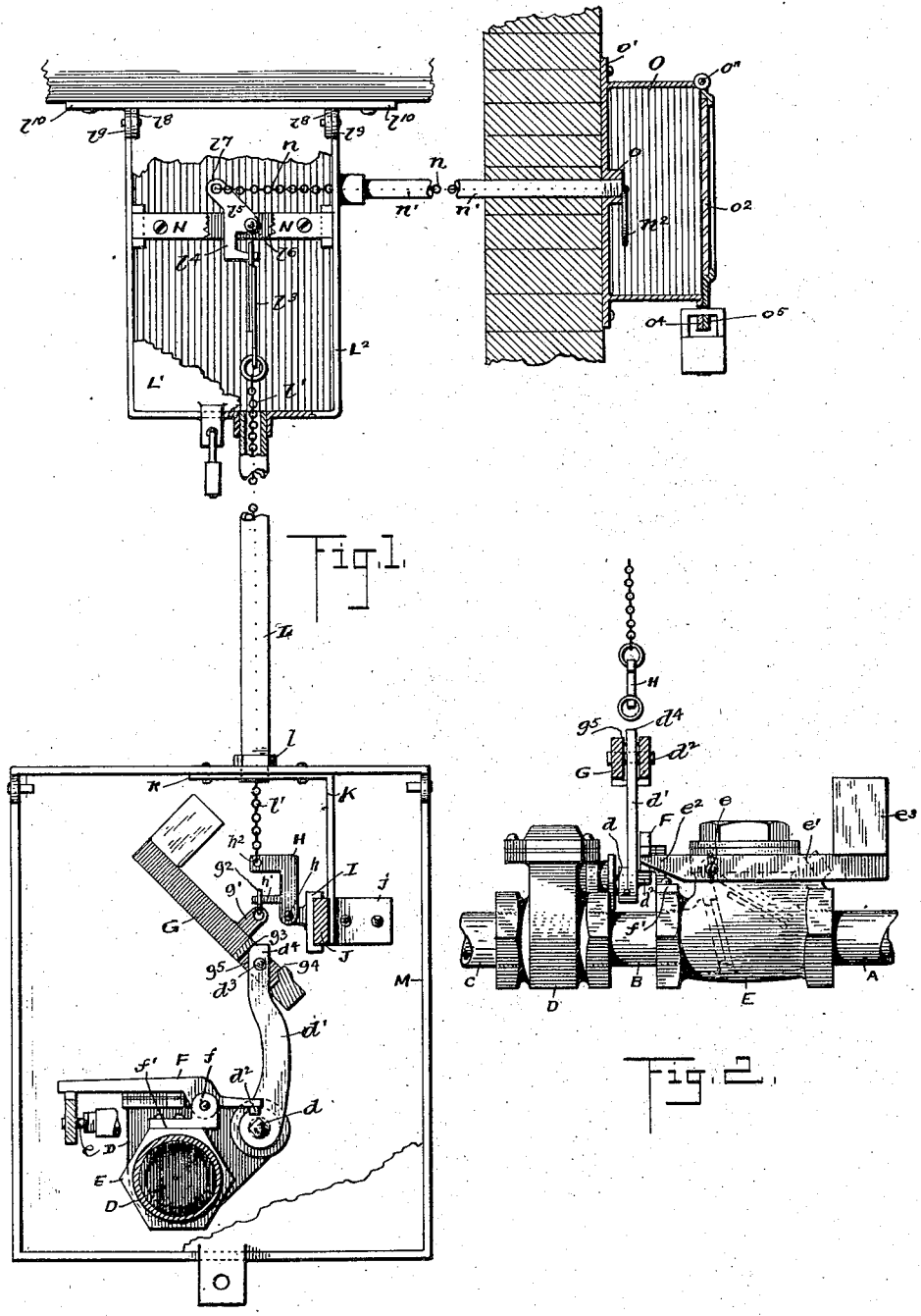

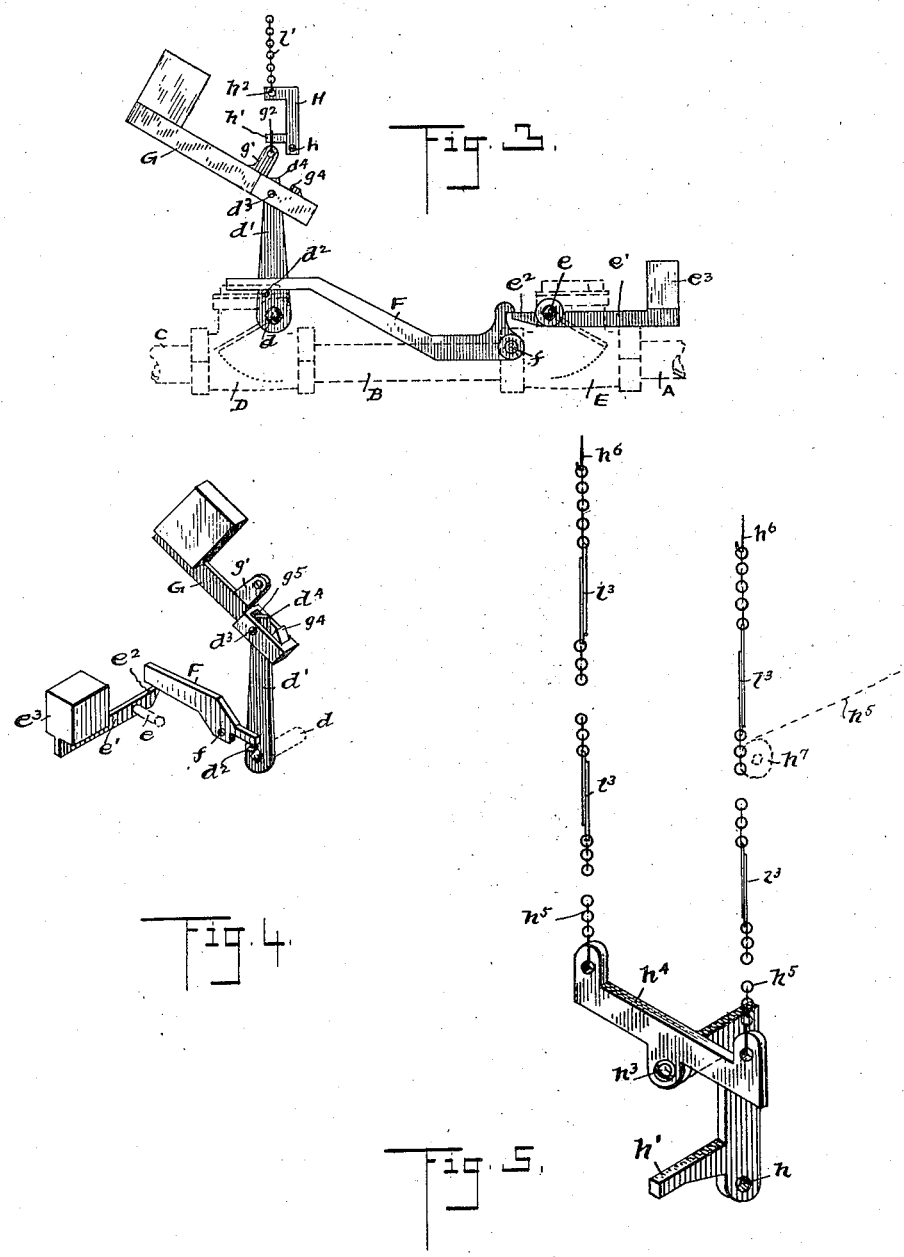

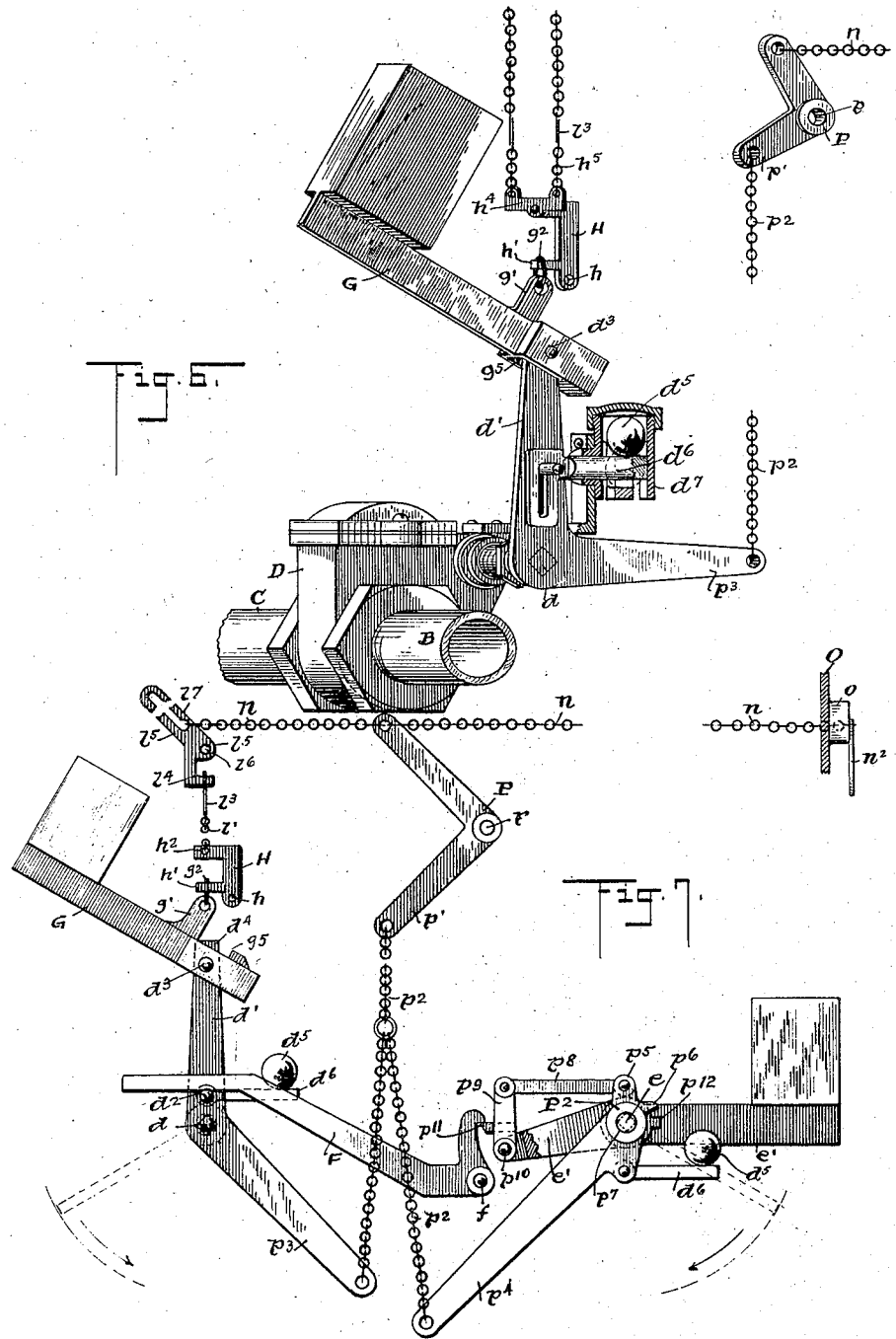

UNITED STATES PATENT OFFICE.

LEROY W. THEIS, OF CLEVELAND, OHIO, ASSIGNOR, BY MESNE ASSIGNMENTS, TO STEPHEN H. BROOKS, OF CLEVELAND, OHIO.

GAS SHUT-OFF.

1,125,210.   Specification of Letters Patent.   Patented Jan. 19, 1915.

Application filed November 11, 1912. Serial No. 730,629.

*To all whom it may concern:*

Be it known that I, LEROY W. THEIS, a citizen of the United States, residing at Cleveland, in the county of Cuyahoga and State of Ohio, have invented certain new and useful Improvements in Gas Shut-Offs, of which the following is a specification.

My invention relates to improvements in gas or other shut-off valves, through which greater certainty of action is secured than with devices of this class heretofore used. The peculiar phase of this kind of services lies in the fact that such safety valves in the large majority of cases will stand unused for numbers of years. Suddenly an emergency arises and the valve shut-off is supposed to act without any doubt whatever. In view of the long inaction of the moving parts they are liable to stick and remain inoperative at the most critical time, thus nullifying their "protective" value absolutely. In view of these severe service conditions it is imperative that the worst contingencies be anticipated as nearly as possible.

The distinctive features of my improvements lie in providing an automatic thermal release at local or distant stations operable mechanically as described; a gravity accelerated arm pivoted to the valve stem lever; a quick release catch in the valve box; an equalizing bar pivoted to the quick release catch that automatically receives distant thermal signals and automatically releases the gravity arm; a plurality of valves in the supply pipe and interlocking mechanism between them; a distantly located manual release operable through thermal connections to the main valve release or by connection to one or both valves separately or together so as to permit of the flow of a combustible substance, liquids under pressure, etc., in the service pipe being stopped by manual effort from without the premises even though through many years of disuse the valve stems should stick and refuse to operate under the accelerated blow of the weighted arm. In this way it is positively assured that the gas supply can be shut off from outside of the building by simply breaking the glass or otherwise securing access to an externally placed wall box, and with one pull operating the release or positive closing mechanism according to which one may at that time be found operable.

The most important feature of all shut-off devices must be a positive and definite assurance that whenever the occasion may arise the gas can be cut off immediately from the outside of the building without in any manner encountering delay through the inoperativeness of any of the interacting details of the devices installed.

With these ends in view I illustrate in the accompanying drawings such instances of adaptation as shall disclose the interrelated principles of operation, etc., without limiting myself to the specific details of construction shown.

Figure 1. is a side elevation of the street box, trigger box and valve box of a system based on my improvements. Fig. 2. is a side elevation of Fig. 1 showing how the various operations interact when more than one valve is used. Fig. 3. is a purely diagrammatic view showing how the principle of interlocking is reached when two valves whose stems are parallel are employed. Fig. 4. is a perspective view showing the relation when two valves whose stems are perpendicular to each other are used. Fig. 5. is a perspective view showing an instance of adaptation wherein a series of distant thermal points of control may be made to operate a single release catch. Fig. 6. is a perspective view disclosing the relation of distantly located points of automatic control and a distantly operated positive manual shut-off for a single valve. Fig. 7. is a diagrammatic view instancing how manually operated means may be connected in series with a local thermal device to actuate the main valve release and simultaneously, positively mechanically close both the main valve and the secondary valve should for any reason the main one prove inoperative after the release has been actuated. This feature is purely supplementary and is a final assurance that the exceptional case will be cared for as well as the ordinary ones. It is not a presumption to suppose that in ninety nine cases out of a hundred the gravity accelerated arm will "break" any sticking valve stem that may be found, and the manner of operation instanced in Figs. 1, 2 and 4 be found sufficient for all practical purposes. For purely precautionary reasons positively connected closing means may be used.

In the accompanying drawings the various reference characters represent some detail constructional parts that may be used in carrying out the features of my invention.

Other, varied and equivalent forms will suggest themselves to persons versed in the art.

There are placed two valves E and D in the main service pipe. The intake pipe A connects with valve E the delivery pipe C to the valve D and the connecting pipe or nipple B joins valves E and D. Valve D may be considered the main valve and E a supplemental valve that is brought into action so as to insure a complete shut-off should the valve D not entirely seal off the flow of gas for any reason. A valve stem $d$ actuates the closure of valve D and stem $e$ performs a similar office for valve E. On the valve stem $d$ a lever $d'$ is secured. This lever carries a pin $d^2$ which controls the interlocking lever F. Its upper end forms an extension $d^4$ below which a weighted arm G is pivoted at $d^3$. The arm G has a slot $g^5$ through which the end of lever $d'$ passes. It also has an abutment $g^3$ that engages the lever $d'$ when the arm G is raised to its highest point and a "striking" projection $g^4$ that engages the projecting end of lever $d'$ after weight $g$ has received considerable acceleration subsequent to the release of catch H. In ear $g'$ ring $g^2$ is placed so as to be free to move therein. It is hooked over the projection $h'$ of the catch H. This catch is of the quick release type being pivoted at $h$, below the projection $h'$. An eye $h^2$ serves to hold the end of the chain $l'$. The catch H is pivoted in a bracket I between suitable ears and the bracket in turn is secured to a cross support J whose ends $j$ are bent to one side so as to provide means for fastening the same to the case M. In order that the alinement of chain $l'$ with respect to the eye $h^2$ may not be disturbed a bent support K is fastened to the cross support J and its projecting end $k$ is riveted or otherwise fastened to the cover's underside of the valve box M. The protective pipe L may be threaded into $k$ and a lock nut $l$ clamps the casing against such projection. The casing M where the gas pipe A enters and C leaves may be provided with lock nuts on the inside and outside thereof so as to firmly hold the same on the gas service pipe. The entire case, in addition may be supported on a suitable shelf if desired.

The interlocking lever F is pivoted at $f$ on a bracket $f'$ secured to the valve E. Its short end engages projection $d^2$ of the lever $d'$ and its long end rests on the end $e^2$ of the valve lever $e'$ secured to the valve stem $e$. This arm is weighted at $e^3$ but the weight cannot act to close the valve until the interlocking arm F is released from projection $d^2$ on the movement of lever $d'$ thus releasing $e^2$ and freeing lever $e'$. It will be seen that the weighted arm G can accelerate after being released by catch H to a considerable extent until projection $g^4$ engages the upper end $d^6$ of valve lever $d'$ when the accumulated force will act to loosen any "set" the valve stem $d$ may have acquired.

The chain $l'$ leads from the valve box M to a trigger box $L^2$ located on the basement ceiling. This box has a suitable cover $L'$ let into the casing $L^2$ and secured thereon by ears $l^8$ and $l^9$. The cover may have a projection at its bottom and conforming to a similar extension of the box. A hole in each part would register, the one with the other and a padlock passed therethrough would prevent access to the box by unauthorized persons. A similar precaution would no doubt be taken with respect of the valve box M. Within the box $L^2$ a trigger $l^5$ is pivoted at $l^3$ between two supporting bars N. The trigger has an arm $l^7$ to which the chain $n$ is attached that leads to the wall box O placed outside of the buildings. A depending catch $l^4$ serves as a hook for one end of a fusible link $l^3$, the other end of which is secured in any suitable manner to chain $l'$ leading to the release catch H of the valve box M. The action of the trigger is such that should the link $l^3$ for any reason stick to catch $l^4$ on account of long disuse it will be "wiped" from off the same when the catch is swung up between the supporting bars N on which the trigger is pivoted at $l^6$. Suitable air holes may be formed in the cover, side and back as desired. The box is held in place by feet $l^{10}$. It is important to have the fusible element $l^3$ located away from the valve box and specially desirable to place it next to the ceiling as the space immediately thereunder will always be found warmer than on the level of the valve box. This difference will cause quicker action of the fusible links. From box $L^2$ a protective pipe $n'$ leads to wall or street box O placed on the outside of the building. Within the pipe, chain $n$ is placed. Box O has an inwardly projecting boss $o$ into which the pipe $n'$ is threaded. This serves to hold the pull ring $n^2$ accessibly and away from the back of the box. A fastening flange $o'$ may be formed on the box or screws may be passed through the back on the inside of the casing. A door pivoted at $o''$ has a glass front $o^2$ secured therein. It also has a projection $o^5$ matching a projection $o^4$ on the box through both of which a padlock is placed. In case of necessity the glass is broken and the ring $n^2$ pulled which action moves the trigger $l^5$, releasing the catch H, which releases arm G thus effecting the closure of the valves D and E. The fusing of the link $l^3$ will release the catch H and in turn arm G. In order that thermal controls may be placed at distant points and action imparted mechanically to catch H, a yoke or equalizing bar $h^4$ is pivoted at $h^3$ at right angles to its pivot $h$, see Fig. 5. To the two projecting ends of this yoke chains $h^5$ are attached. These may lead vertically to the various stories of the buildings and be supported at their extreme ends by hooks $h^6$. Fusible links $l^3$ may be fastened in the chain wherever desired. If the chains are to run horizontally they may pass over idler sheaves $h^7$.

In situations where thermal controls are not needed and an exclusive mechanical shut-off will suffice I may dispense with the weighted lever, G, see Fig. 6, and as a precaution against the accidental reopening of the valve a locking device comprising a rod or link $d^6$ actuated through the movement of lever $p^3$ is employed. The automatic locking is accomplished by means of a self-acting agency $d^5$ that is loosely held above the rod $d^6$ within a casing $d^7$ secured in any suitable manner to the valve casing. This casing has openings formed in the bottom so as to avoid the possibility of dirt accumulating therein. The operation of this automatic locking device is substantially as follows: When the lever $p^3$ is moved the arm $d'$ moves with it carrying the rod $d^6$ from under the ball $d^5$. The ball drops into the path of the rod $d^6$ so that it cannot be returned to its first position until the ball is lifted above the path of the rod thus securely locking the valve against accidental reopening. When two valves are used as shown in Fig. 7 the self-locking feature described above is applied to each valve in practically the same manner. The balls and the rods are shown diagrammatically in Fig. 7.

It is immaterial as to the specific kind of a locking device used. The same features are applicable to a single shut-off valve as shown in Fig. 6 or equally to a plurality of valves and it is not required that they be only manually operated as the locking feature has the same merit when used in either connection.

Should only one valve be used and a positive distantly operated mechanical closing device be employed in connection with distant thermal controls the relation of parts would be somewhat as shown in Fig. 6. In this the valve lever $d'$ is of bell crank form having the extension $p^3$ from which a chain $p^2$ leads to $p'$ of bell crank P pivoted at $p$ in any suitable receptacle, not shown, as trigger box $L^2$. Chain $n$ would reach from this point to the street box O as already described.

Whenever a positive mechanical action from a distance is desired, in connection with a local thermal control the arrangement would be similar to that shown in Fig. 7. The chain $n$ in addition to being fastened to the trigger $l^5$ would also be secured to bell crank P as in Fig. 6. The chain $p^2$, however, would pass to the bell crank $P^2$ being fastened to arm $p^4$. The other arm $p^5$ connects by means of a link $p^8$ with a rocker $p^9$ pivoted at $p^{10}$ to valve arm $e'$. This rocker presents a ledge $p^{11}$ on which the hook of the interlocking arm F rests. In order that the rocker may not be actuated until moved by link $p^8$ its ledge $p^{11}$ is placed almost above its pivoted center. The bell crank $P^2$ has a certain amount of idle movement so as to effect the release of the rocker $p^9$ before starting to turn the valve stem $e$. This is effected by forming projection $p^7$ on the hub of the arm $e'$ and pivoting the bell crank $P^2$ thereon co-axially with the valve stem $e$. The projection $p^6$ of the bell crank would not engage the projection $p^{12}$ until the rocker $p^9$ was released from the interlocking catch thus admitting of closing the valve E manually whether the valve D has been closed or not, the valves E and D not being shown in Fig. 7.

What I claim is—

1. In shut offs, a main supply pipe, a plurality of shut off valves placed in tandem therein, levers for releasing said valves substantially simultaneously but independently of each other and of the flow therein, interlocking means between the levers, catches for holding the levers in "open" position, and means for releasing the same automatically or manually.

2. In shut offs, a main valve, a lever connected therewith, a weighted arm pivoted to said lever and movable independently thereof in the same relative plane of rotation as the valve, a stop determining the free movement of the arm with respect to the lever, a catch to hold the arm and lever in an "open" position, and a plurality of distantly operated controls for said catch.

3. In shut offs, a main valve, a jointed control lever connected therewith comprising a lever secured to said valve and a supplementary weighted arm pivoted to the lever, a catch to hold the arms in a raised position, a support for said catch, and means for manually and automatically releasing the catch to close the valve.

4. In shut-offs, a main pipe valve, an articulated operating lever connected therewith, a weight on the free end of said lever, a catch to hold the same in an "open" position, a distantly controlled support for said catch, and means for automatically releasing the same at a predetermined temperature.

5. In shut-offs, a main pipe valve, a control lever secured thereto, a catch to hold the lever and attached valve in "open" position, manual means having an automatic release interposed therein, either the manual or automatic means being adapted to actuate said catch without the normal operation of the other.

6. In shut offs, a main pipe valve, flexible means for manually actuating the same at a distance therefrom, self actuated means normally tending to close the valve, means for holding the same "open," a release therefor, and separate automatic and manual means for actuating the release to permit of the self closing of the valve.

7. In shut offs, a main pipe valve, a means of control attached thereto, a catch to normally hold the valve open, means at a distance therefrom for automatically releasing said catch, and means for manually closing the valve independently of said catch.

8. A main valve, a control lever secured thereto, a pivoted weight attached to said lever, means for supporting the weight, means for automatically releasing the support, means for manually closing the valve at a distance therefrom independently of the support, and means for locking the control lever after it has been actuated.

9. A main valve, a means of control attached thereto, a catch to normally hold the valve open, means at a distance therefrom for automatically releasing the catch, means for manually closing the valve independently of said catch, and automatic means for locking the valve after it has been actuated.

10. A main supply pipe, a controlling valve located therein, a suitable casing therefor, means for holding the valve "open," a thermal box independent of the valve casing, a pull box located externally of the building supplied by said pipe, suitable connections between the casing and pull box adapted to manually close the valve, connections between the valve casing and thermal box adapted to automatically permit of the self closure of the valve at a predetermined temperature.

11. A main supply pipe, a shut off valve placed therein, a casing therefor, a thermal box, a trigger within the casing, suitable connections between the box and casing adapted to normally hold the valve open, a distantly placed pull box, and mechanical connections between the same and the valve whereby the valve may be closed manually independently of the trigger.

12. A main pipe, a shut-off valve located therein, a catch for holding the same "open," a suitable casing therefor, an equalizing bar pivoted to the catch, and separate thermal elements connected to each end of said bar.

13. A main valve, a control lever secured thereto, a pivoted weight attached to said lever, means for supporting the weight, means for automatically releasing the support and means for manually closing the valve at a distance therefrom independently of the support.

14. A main valve, a two-part control lever including a weight attached thereto, a support for the weighted member, a release for the same, and a distantly located and manually operated valve closing device whereby the release of the support or the operation of the closing device independently of each other is attained.

15. A main pipe valve, a means of control attached thereto, a releasable holder to normally keep the valve open, flexible means at a distance therefrom adapted to maintain said holder inactive without preventing its being released automatically or by independently operated manual means, and a suitable conduit or casing to convey said flexible means from one point to another.

16. A main pipe valve, a means of control attached thereto, a suitable casing, a holder to normally keep the valve open supported by the casing, means for automatically releasing the holder, independent means for manually closing said valve, an inclosed box therefor, flexible connections leading from said box to the valve, and suitable supports for said connections.

17. A main pipe, a shut off valve placed therein, a two part operating lever connected therewith, a holder to normally keep the valve open, a distantly located pull box, flexible connections leading from the pull box to the holder, automatic means interposed in such connections adapted to release the holder independently of said pull box, conduits and guides inclosing and protecting the flexible connections wherever required, a separate manually operated connection leading to the valve from the pull box, and suitable guiding supports therefor.

18. A main pipe valve, a two-armed operating lever connected therewith, a holder to normally keep the valve open, means tending to close the same pivoted to one arm and movable independently thereof, a distantly located pull box, flexible connections leading therefrom to the other arm adapted to close it manually, and suitable supports and guides for said connections.

19. A main pipe valve, an operating lever, a weighted arm pivoted to said lever and adapted to close the valve, an inclosing casing, a holder adapted to keep the valve "open" supported by the casing, a distant pull box, flexible connections leading therefrom to the valve whereby the weighted arm may be disengaged from the holder and the valve closed manually, and suitable supports and guides for said connections.

In testimony whereof I affix my signature in presence of two witnesses.

LEROY W. THEIS.

Witnesses:
M. W. NELSON,
STEPHEN H. BROOKS.